(12) United States Patent
Rubel

(10) Patent No.: US 12,735,201 B2
(45) Date of Patent: Sep. 15, 2026

(54) ANISOTROPIC APERTURE STAR CAMERA SYSTEMS AND METHODS

(71) Applicant: Planet Labs PBC, San Francisco, CA (US)

(72) Inventor: Michael Thomas Rubel, Burbank, CA (US)

(73) Assignee: PLANET LABS PBC, San Francisco, CA (US)

( * ) Notice: Subject to any disclaimer, the term of this patent is extended or adjusted under 35 U.S.C. 154(b) by 153 days.

(21) Appl. No.: 18/740,990

(22) Filed: Jun. 12, 2024

(65) Prior Publication Data

US 2025/0382072 A1 Dec. 18, 2025

(51) Int. Cl.
*B64G 1/36* (2006.01)
*G01C 21/24* (2006.01)

(52) U.S. Cl.
CPC ............. *B64G 1/361* (2013.01); *G01C 21/24* (2013.01)

(58) Field of Classification Search
CPC ........... B64G 1/36; B64G 1/361; G01C 21/24
See application file for complete search history.

(56) References Cited

U.S. PATENT DOCUMENTS 9,185,290 B1 * 11/2015 Lapstun ................. H04N 23/58
2016/0134813 A1 * 5/2016 Hu ....................... H04N 23/687
348/208.11

* cited by examiner

*Primary Examiner* — Kevin K Pyo
(74) *Attorney, Agent, or Firm* — Dority & Manning, P.A.

(57) ABSTRACT

Spacecrafts are disclosed herein. The spacecraft can include a primary payload sensor, the primary payload sensor being aligned to capture images in a direction of a first axis, and at least one secondary imaging system for determining a position of the spacecraft, the at least one secondary imaging system being aligned to capture images in the direction of a second axis. The at least one secondary imaging system can include a housing, the housing including a first end and a second end, wherein the first end includes an opening into an internal portion of the housing, an image sensor positioned within the internal portion of the housing, and an optical element positioned within the internal portion of the housing, wherein the optical element has a length parameter and a width parameter, wherein one of the length parameter and the width parameter is larger than the other parameter.

28 Claims, 12 Drawing Sheets

ANISOTROPIC APERTURE STAR CAMERA SYSTEMS AND METHODS

FIELD

The present disclosure relates generally to spacecraft positioning systems. In particular, embodiments of the present disclosure are related to anisotropic aperture star cameras that can be used to assist in determining position and attitude of a spacecraft or georeferencing imaged targets.

BACKGROUND

Various spacecrafts, such as Earth-orbiting satellites, serve a variety of purposes, such as imaging the surface of the Earth, providing telecommunications, and the like.

To properly determine the position and attitude of the spacecraft, these spacecraft can include various guidance, navigation, and control (GNC) systems, which may include one or more star cameras, which capture images of the stars. The captured images can be compared to star charts stored in a computer memory. These comparisons can be used to determine the attitude of the spacecraft in relation to the stars and, thus, can provide geolocation information for the point that a primary payload, such as a camera or other sensor, of the spacecraft is pointing to on the surface of the Earth.

SUMMARY

Aspects and advantages of embodiments of the present disclosure will be set forth in part in the following description, or may be learned from the description, or may be learned through practice of the embodiments.

In one aspect of the present disclosure, a spacecraft is provided. The spacecraft can include a primary payload sensor, the primary payload sensor being aligned to capture images in a direction of a first axis, and at least one secondary imaging system for determining a position of the spacecraft, the at least one secondary imaging system being aligned to capture images in the direction of a second axis. The at least one secondary imaging system can include a housing, the housing including a first end and a second end, wherein the first end includes an opening into an internal portion of the housing, an image sensor positioned within the internal portion of the housing, and an optical element positioned within the internal portion of the housing, wherein the optical element has a length parameter and a width parameter, wherein one of the length parameter and the width parameter is larger than the other of the length parameter and the width parameter.

In another aspect of the present disclosure, an imaging system is provided. The imaging system can include a housing, the housing including a first end and a second end, wherein the first end includes an opening into an internal portion of the housing, an image sensor positioned within the internal portion of the housing, and an optical element positioned within the internal portion of the housing, wherein the optical element has a length parameter and a width parameter, wherein at least one of the length parameter and the width parameter is larger than the other of the length parameter and the width parameter.

In a further aspect of the present disclosure, a method for determining an attitude of a spacecraft is provided. The method can include capturing, by at least one secondary imaging system of the spacecraft, an image of one or more stars, the at least one secondary imaging system being aligned along a second axis that is different than a first axis of a primary payload sensor of the spacecraft. The at least one secondary imaging system can include a housing, the housing including a first end and a second end, wherein the first end is an opening into the housing, an image sensor positioned within the housing; and an optical element positioned in the opening of the first end, wherein the optical element has a length parameter and a width parameter, and wherein one of the length parameter and the width parameter is larger than the other of the length parameter and the width parameter. The method can also include comparing the image of one or more stars to a stored image of the one or more stars and determining the attitude of the spacecraft based on the comparison of the image of one or more stars to the stored image.

Other example aspects of the present disclosure are directed to systems, methods, platforms, and apparatuses for spacecrafts.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
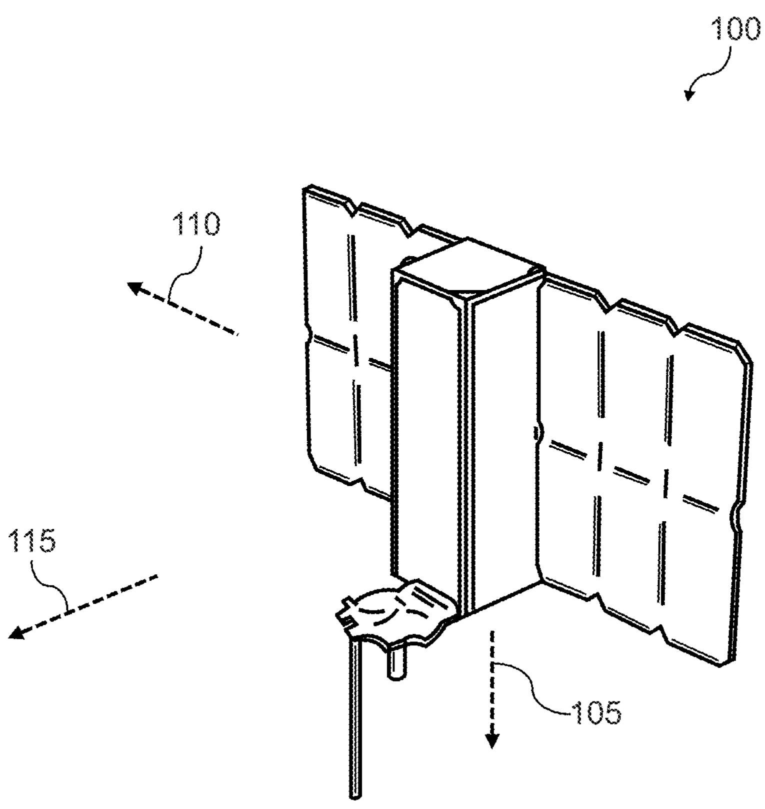
FIG. 1 depicts a spacecraft according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an anisotropic-aperture star camera and spacecrafts implementing anisotropic-aperture star cameras. In particular, an aperture of the star camera (also referred to herein as "secondary imaging systems") can be designed to induce anisotropy. For example, the aperture can include an optical element. The optical element can include a lens or a mirror that is designed to help to induce anisotropy. This can be accomplished by, for example, designing one or more optical elements (i.e. lenses or mirrors) to have one size parameter (e.g., length) be much larger than a second size parameter (e.g., width). These cameras have smaller form factors and, therefore, may be lighter in weight than existing cameras and may have reduced volume in relation to existing cameras, which may be advantageous when launching spacecraft, as lighter-weight spacecraft require less resources to launch and maintain in operation.

Attitude knowledge of a spacecraft can improve geolocation accuracy (e.g., the accuracy of the point on the Earth's surface being captured by a primary payload sensor of the spacecraft or an exact location of a telecommunication satellite in relation to devices it is communicating with). For imagery satellites, spacecraft attitude accuracy is especially valuable when feature-based ground rectification cannot be relied upon, such as over open bodies of water, in areas obscured by clouds or other weather patterns, or when latency requirements limit the allowable computation time for ground-feature matching. In some embodiments, the primary payload sensor may be considered and referred to as a "primary camera" of the spacecraft.

Generally, the larger an aperture of a star camera, the more precisely the attitude of a spacecraft that includes the star camera can be measured, as the aperture is proportional to different characteristics of the star camera, such as being inversely proportional to the impulse response width of the star camera, and being quadratically proportional to a number of photons per unit time.

The instantaneous attitude of the spacecraft has three degrees of freedom. However, in certain applications, each of the three degrees of freedom of the attitude of the spacecraft can have differing levels of significance in determining geolocation, and, for example, in georeferencing an image captured from an imagery satellite. For example, FIG. 1 illustrates a spacecraft 100 (e.g., an imagery satellite, a telecommunications satellite, or other spacecraft). Main axis 105 is the axis along which a primary payload sensor, such as a primary imaging camera, of the spacecraft 100 is aligned (also commonly referred to as the boresight). Angular, or rotational, errors about main axis 105 result in relatively small errors in determined or attributed ground position compared to angular errors in perpendicular axes 110 and 115. For example, when spacecraft 100 is an imagery satellite, which captures images of a celestial body (i.e. Earth) in the direction of the main axis 105 (as discussed in further detail in FIG. 4), a rotational error around the main axis 105 would result in a slight rotation of the captured image, whereas rotational errors around either perpendicular axis 110 and 115 may result in a different area of Earth's surface being captured altogether. Similarly, when spacecraft 100 is a telecommunications satellite, which sends or receives signals in the direction of the main axis 105, a rotational error around the main axis 105 may result in no functional change at all, as the main axis 105 is still pointing towards the direction of the signal transmission or reception, whereas rotational errors around either perpendicular axis 110 and 115 may result in a communication failure by sending the signal in the wrong direction, or failing to position properly to receive the signal.

For example, when looking to nadir, or a point on the celestial sphere directly below the spacecraft 100, the ratio of angular error sensitivities on each axis can be based on Equation 1.

$$(A\theta_{fov}/\delta\theta_{perp}) \quad \text{Equation 1}$$

Equation 1 represents ground position error for the perpendicular axes 110 and 115 caused by rotation error about the respective axes 110 and 115. $\theta_{fov}$ represents a camera field of view angle. Angle of rotation about each axis is represented by $\delta\theta_{perp}$, and A is the altitude of the spacecraft 100 above the ground.

The ground position error caused by rotation error in the main axis 105 (or boresight axis) can be characterized as set forth in Equation 2.

$$(A\theta_{fov}/2\delta\theta_{bor}) \quad \text{Equation 2}$$

In Equation 2, A again represents the altitude of the spacecraft 100 above the ground and $\theta_{fov}$ represents a camera field of view angle. $\Delta\theta_{bor}$ represents the angle about which the spacecraft 100 is rotated about the boresight axis.

Thus, it is advantageous to minimize rotation errors in the perpendicular axes 110 and 115.

To minimize rotational errors in the perpendicular axes 110 and 115, one or more secondary imaging systems (e.g., star cameras) having anisotropic apertures can be used. These secondary imaging systems (e.g., including cameras and/or sensors), can be simply represented as an optical element, such as a lens or mirror, and an image sensor, such as a focal plane array, positioned within the housing of the secondary imaging system. For example, with a lens, the image sensor can be positioned anywhere within the housing of the secondary imaging system that receives light manipulated by the lens. With a mirror, the image sensor can be opposite the mirror at the other end of the secondary imaging system, with empty space in the middle. The distance from the optical element to the image sensor is the focal length, and the diameter of the optical element is the aperture. The ratio of the focal distance to the diameter is referred to as the focal ratio, or f-number, of the secondary imaging system. The secondary imaging system can be referred or considered "secondary cameras" of the spacecraft 100.

In some embodiments, imaging systems can include more than one optical element (e.g., lens or mirror), and can include both lenses and mirrors for manipulating and reflecting light to reach an image sensor. These selections can be made based on space available in the housing, desired field of view, and off-axis image quality considerations, as would be well known to a person of skill in the art.

Anisotropy can be introduced by changing the dimensions and/or shape of the optical element or elements. For example, the optical element can be or include a circular lens or mirror that can be replaced with a rectangular or elliptical lens or mirror, where one dimension (length or width) is larger than the other dimension. This also changes the aperture area by decreasing it, which also proportionally decreases the number of photons detected in the same total exposure time.

With the new dimensions and/or shape of the optical element, the secondary imaging system (e.g., star camera) can measure vertical angles more precisely than horizontal angles when the length of the optical element is larger than the width, or vice versa if the width is larger than the length. For example, if the length of the optical element is the same as a diameter of a circular optical element, but the width of the optical element is smaller than the diameter of the circular optical element, the angular sensitivity of the secondary imaging system in the longer direction remains the same as the circular optical element, but the sensitivity of the secondary imaging system in the shorter direction is proportionally reduced.

The aspect ratio of the dimensions can determine the amount of angular sensitivity that can be detected. For example, in a secondary imaging system where the length of the optical element is about 20-40 times longer in one direction than the other, the secondary imaging system would have 20-40 times more angular sensitivity in the longer direction than the shorter direction. While 20-40 times is provided as an example, the range of proportions can be anywhere from 1.5 times to many hundreds of times.

In some implementations, a smaller optical element can still give high angular precision given adequate exposure time. Exposure time can be limited because the spacecraft may be always rotating (at least once per orbit, but more rotations can occur). Therefore, the use of the smaller optical element can still provide high angular precision even if the dimensions generally result in lower angular sensitivity in a particular dimension if proper exposure time is introduced.

A secondary imaging system (e.g., star camera) implementing this type of optical element, along with the image sensor, can, therefore, fit in a smaller housing, as the optical element with differing dimensions are smaller than circular lenses. This may reduce size and weight of such imaging systems, which may provide advantages over existing designs, especially in satellite implementation scenarios, where weight management and form factor are critical factors for successful launch and operation of the satellites.

Thus, example aspects of the present invention may provide lighter weight and smaller form factor secondary imaging systems (e.g., star cameras) without sacrificing accurate geolocation due to the design of the anisotropic optical element and the design of different parameters associated with the secondary imaging systems, such as field of view, focal length, and desired angular sensitivity. Additionally or alternatively, example aspects of the present invention may provide for improved geolocation, while minimizing the weight and form factor required for a similarly-capable isotropic optical element.

Figure 2A:
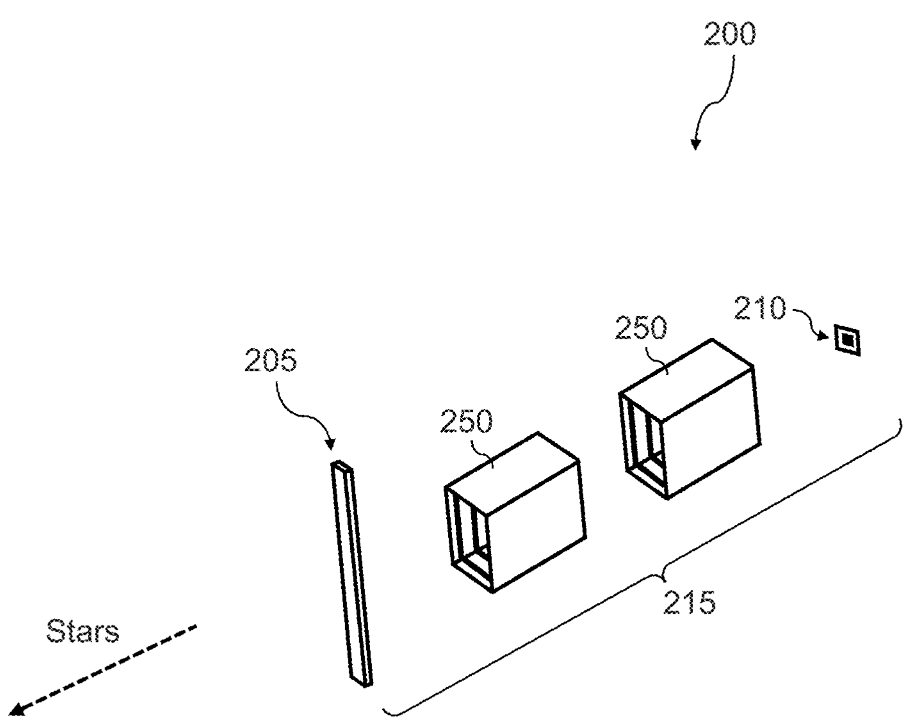
FIG. 2A depicts internal components of an imaging system according to example embodiments of the present disclosure.

FIG. 2A illustrates internal components of a secondary imaging system 200 according to example embodiments of the present disclosure. The secondary imaging system 200 can include an optical element 205 and an image sensor 210. In one embodiment, the optical element 205 can be a lens, made of a transparent material, that allows light to pass through the optical element 205 and into an internal portion of the imaging system 200, where the light is received by the image sensor 210 positioned within the imaging system 200, such as being positioned at a distal end of the imaging system 200.

Figure 2B:
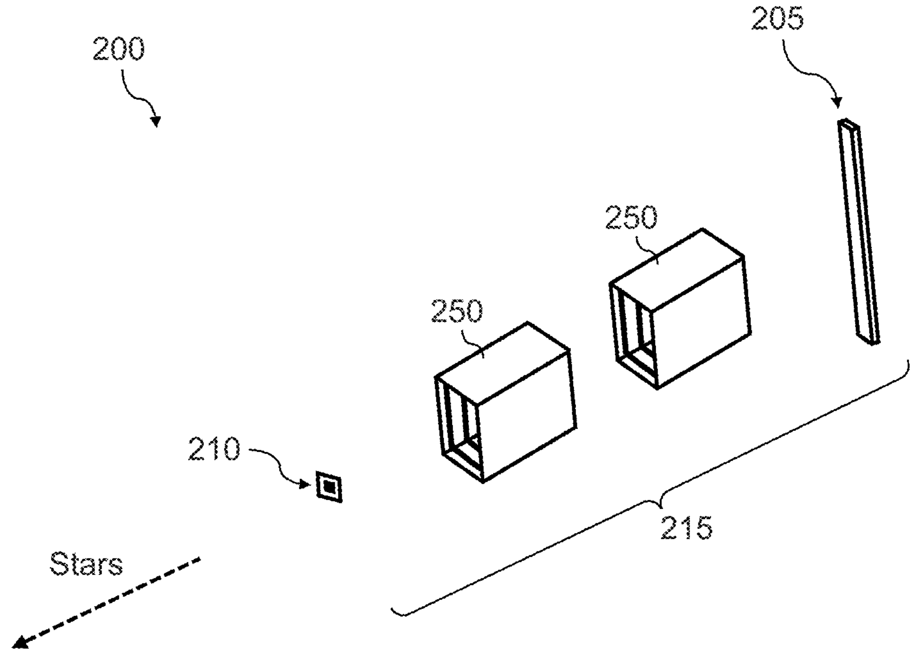
FIG. 2B depicts internal components of an imaging system according to example embodiments of the present disclosure.

Additionally or alternatively, the optical element 205 can be a mirror, made of a reflective material, that reflects light that is to be received by the image sensor 210 within the imaging system 200. In one embodiment, the mirror can be positioned at a distal surface from an opening of the secondary imaging system 200 and can reflect light back to the image sensor 210. The image sensor 210 can be positioned proximate to an opening of the secondary imaging system 200, such as the position of the image sensor 210 in FIG. 2B.

In some embodiments, the dimensions of the optical element 205 are selected based upon a desired angular sensitivity ratio. For example, different designs for secondary imaging systems (e.g., star cameras) may have different angular sensitivity ratios, such 30:1 or 120:1. In some embodiments, the angular sensitivity ratios can be determined by a field of view angle of the imaging system 200. For example, a secondary imaging system with a 30:1 angular sensitivity ratio can have a maximum field-of-view angle of 4 degrees, and a secondary imaging system with a 120:1 angular sensitivity ratio can have a maximum field-of-view-angle of 1 degree.

The dimensions of the optical element 205 can be selected based on this desired angular sensitivity ratio. The dimensions can be within the same two dimensional plane. For example, the optical element 205 can have a first dimension that is 15-45 times longer than a second dimension (e.g., 30 times longer than wide or vice versa) to obtain a particular angular sensitivity ratio (e.g., a 30:1 angular sensitivity ratio). In another example, the optical element 205 can have a first dimension be 100-150 times longer than a second dimension (e.g., 120 times longer) to obtain a particular angular sensitivity (e.g., a 120:1 angular sensitivity ratio).

In some embodiments, the optical element 205 can be shaped any appropriate shape that includes at least one dimension that is larger than the second dimension. For example, the optical element 205 can be a rectangular shape or an elliptical shape, where the length or width of the optical element 205 is greater than the other of the length or the width.

In some embodiments, the optical element 205 can be a rectangular or elliptical "slice" of a circular optical element, which can help to enable anisotropy.

The image sensor 210 can be an electronic circuit, such as a focal plane array, that receives the light through the optical element 205 and, based on the received light, generates a signal indicative of what is being viewed by the imaging system 200, such as a collection of stars. In some embodiments, the image sensor 210 can be electronically coupled to other circuitry, such as one or more processors, non-transitory memories, or other circuitry, configured to receive the signal indicative of what is being viewed and perform various functions.

In some embodiments, the optical element 205 and the image sensor 210 are separated by focal length 215. The focal length 215 can be determined by the desired dimensions of the optical element 205. The ratio of the focal length 215 to a diameter of a circular lens is the focal ratio. Similarly, the ratio of the focal length 215 to the longer dimension of the optical element 205 is the focal ratio of the imaging system 200. Thus, to achieve a desired focal ratio, the focal length 215 can be selected based on the longer dimension of the optical element 205. For example, for a focal ratio of focal length/1.25 in the longer dimension and focal length/50 in the shorter dimension, a focal length 215 can be selected to be 25 centimeters for optical element 205 having a longer dimension of 20 centimeters and a shorter dimension of ⅓ centimeters.

In some embodiments, the internal components of the secondary imaging system 200 can include internal baffling 250. The internal baffling 250 can include components that prevent stray light from interfering with the imaging system 200, such as interior surfaces, edges, ridges, matte surface material, and similar mechanisms for minimizing stray light.

Figure 3A:
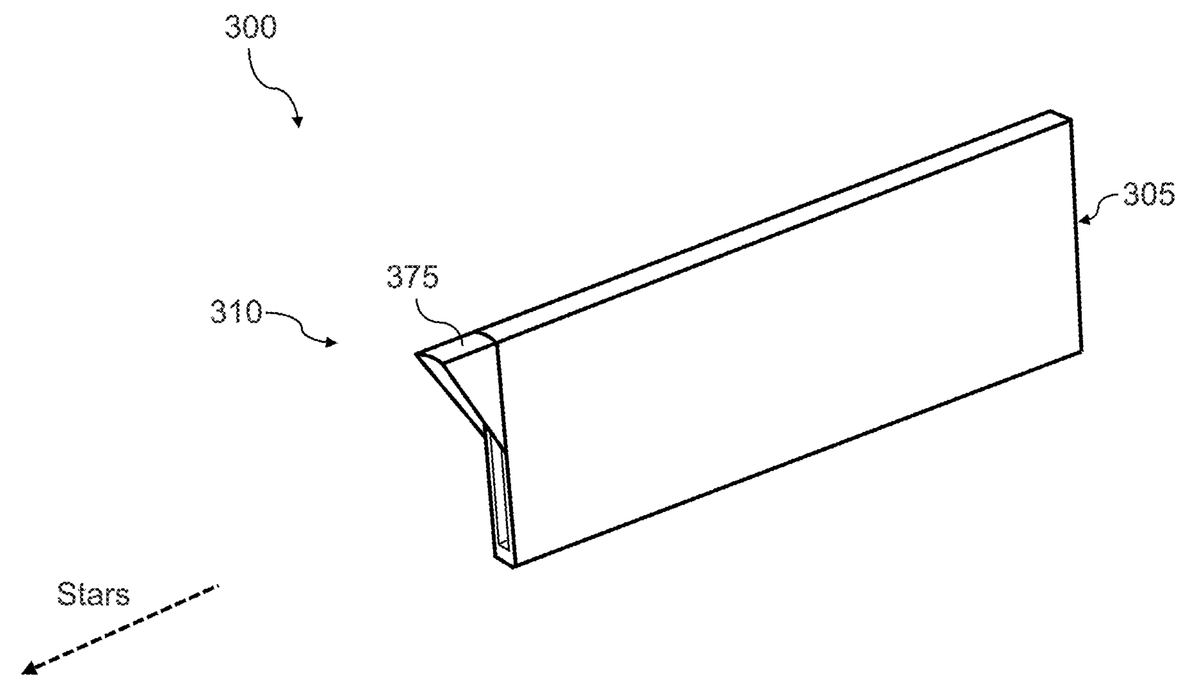
FIG. 3A depicts external components of an imaging system according to example embodiments of the present disclosure.

FIG. 3A illustrates external components of a secondary imaging system 300 according to example embodiments of the present disclosure. The secondary imaging system 300 can be, for example, a star camera. The secondary imaging system 300 includes a housing 305 and an opening 310 at a first end of the housing 305. The opening 310 can fit an optical element 205, such as a lens, and provide an opening to interior space of the housing 305 for light entering through the optical element 205. In some embodiments, the opening 310 can have one dimension, such as length or width, that is a longer dimension than the other dimension, such as illustrated by the substantially rectangular shape of the opening 310. In some embodiments, the dimensions of the opening 310 can be selected based on the dimensions of the optical element 205 that will be placed in the opening 310. In some embodiments, the shape of the opening 310 can be designed to fit the shape of the optical element 205, such as having a substantially rectangular shape for the opening 310 for a rectangular optical element or an elliptical shape for the opening 310 for an elliptical optical element.

As used herein, the term “substantially rectangular,” as used to describe an opening, refers to a shape having a first pair of opposing sides and a second pair of opposing sides, each side of the pairs of opposing sides defining a reference line (e.g., an imaginary line extending straight from a first end to a second end) within 15 degrees of parallel of a reference line defined by the other of side of the respective pair of opposing sides. The reference line of each side further defines an angle with the reference line of an adjacent side within 15 degrees of 90 degrees. The first pair of opposing sides can be a different length than the second pair of opposing sides. Each side of the first and second pairs of opposing sides extends in a straight line or in a manner that provides for the same functionality as extending in a straight line (e.g., minor deviations for structural purposes or manufacturing variations, rounded corners, or the like).

For selecting the size of the opening 310, other parameters can be considered. For example, increasing the size of the opening 310 can allow more light energy to enter the imaging system 300 per unit of time, which would allow dimmer objects to be seen, and therefore increase the number of objects that are visible for determining attitude of the imaging system 300. Additionally, decreasing the field of view angle would decrease the number of objects that are visible due to a narrower view. Thus, to maintain a fixed number of visible objects, the size of the opening 310 can balance these two factors. In particular, these two factors can be inversely proportional. Therefore, doubling the size of the opening 310 allows the field-of-view angle to be halved, and vice-verse.

Figure 3B:
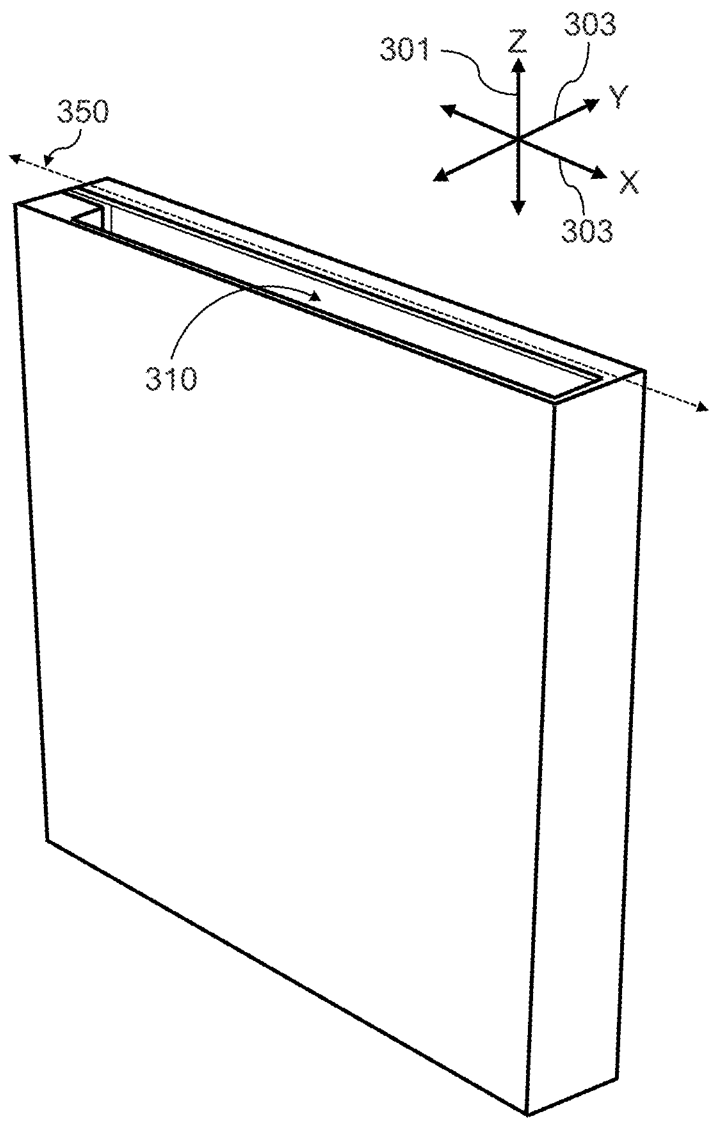
FIG. 3B depicts an off-axis opening for a housing according to example embodiments of the present disclosure.

In some embodiments, the opening 310 can be located off-axis of a central axis 350 of the imaging system 300. This is illustrated in FIG. 3B. Central axis 350 is an axis positioned through the center of an end of a housing that includes opening 310. Opening 310 is then positioned such that a center axis of the opening 310 is not shared with central axis 350. In such an off-axis design, light may enter the housing 305 through the opening 310. The optical element 205, such as a mirror, may be positioned at or near the distal end of the housing (i.e. opposite the opening 310), such that light is reflected back towards the opening 310 of the housing 305. The image sensor 210 may be positioned proximate to the opening 310 of the housing, such as the thick face on the opposite side of 350 from the opening 310. Either design can be considered for the opening 310, but the off-axis design can, for example, enable certain, more compact configurations of the opening 310, and may enable certain design configurations having optical elements which may include one or more mirrors.

In some embodiments, the housing 300 can include exterior baffling 375 covering a portion of the opening 310 to prevent stray light from entering the imaging system 300. In some embodiments, the thickness of the external baffling 375 can be determined based on a desired field of view of the imaging system 300. For example, external baffling 375 can obstruct a portion of a field of view of the imaging system 300 if the external baffling 375 is too large or the field of view is too wide. Therefore, the external baffling 375 can be designed such that the thickness is limited to only what will not interfere with the field of view of the imaging system 300.

Figure 4A:
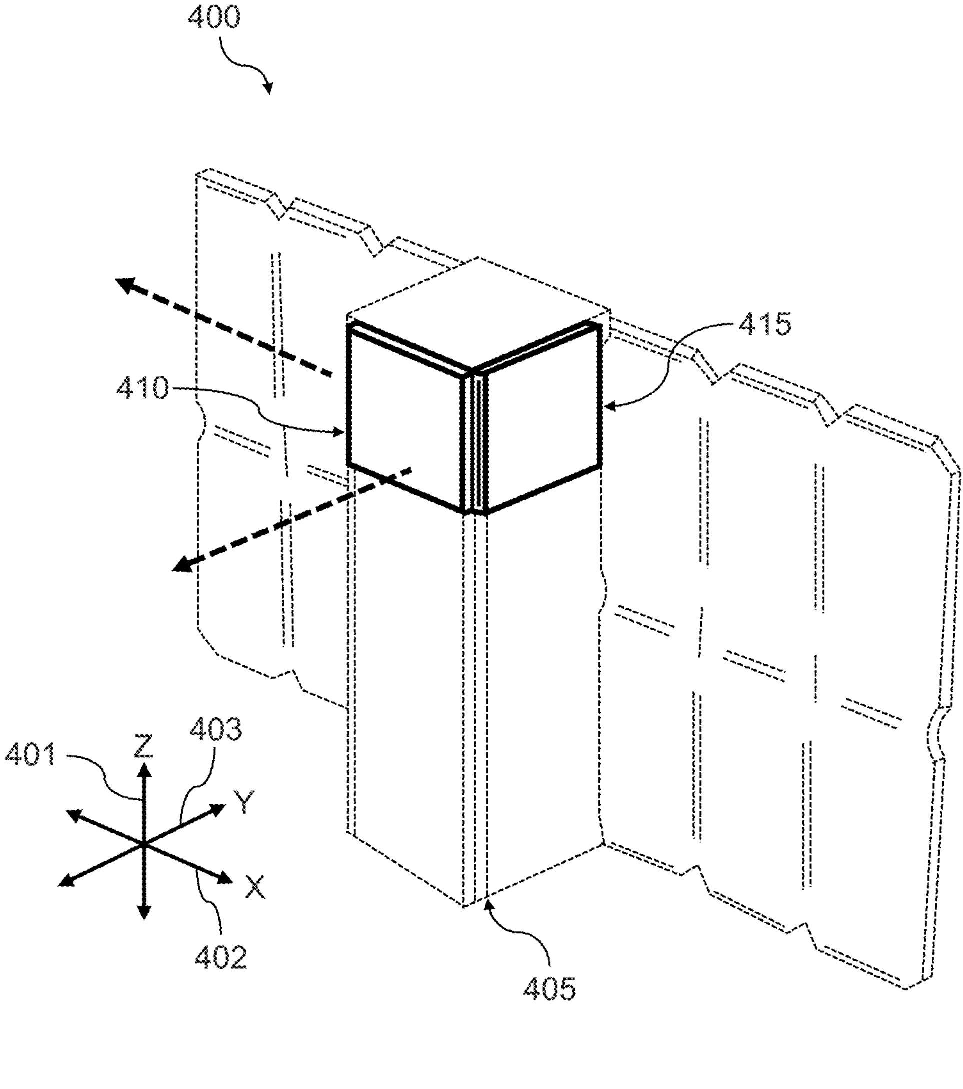
FIG. 4A depicts a spacecraft according to example embodiments of the present disclosure.

FIG. 4A illustrates a spacecraft 400 according to example embodiments of the present disclosure. The spacecraft 400 can be, in one embodiment, an imagery satellite designed to orbit a celestial body for imaging surfaces of the celestial body. The spacecraft 400 may also be a communication satellite, navigation satellite, or any other spacecraft that orbits a celestial body which includes guidance, navigation, and control systems, including for example, positioning using imaging systems. The spacecraft 400 can be configured to orbit at various altitudes such as low earth orbit (LEO), medium earth orbit (MEO), or geostationary orbit (GEO).

Figure 4B:
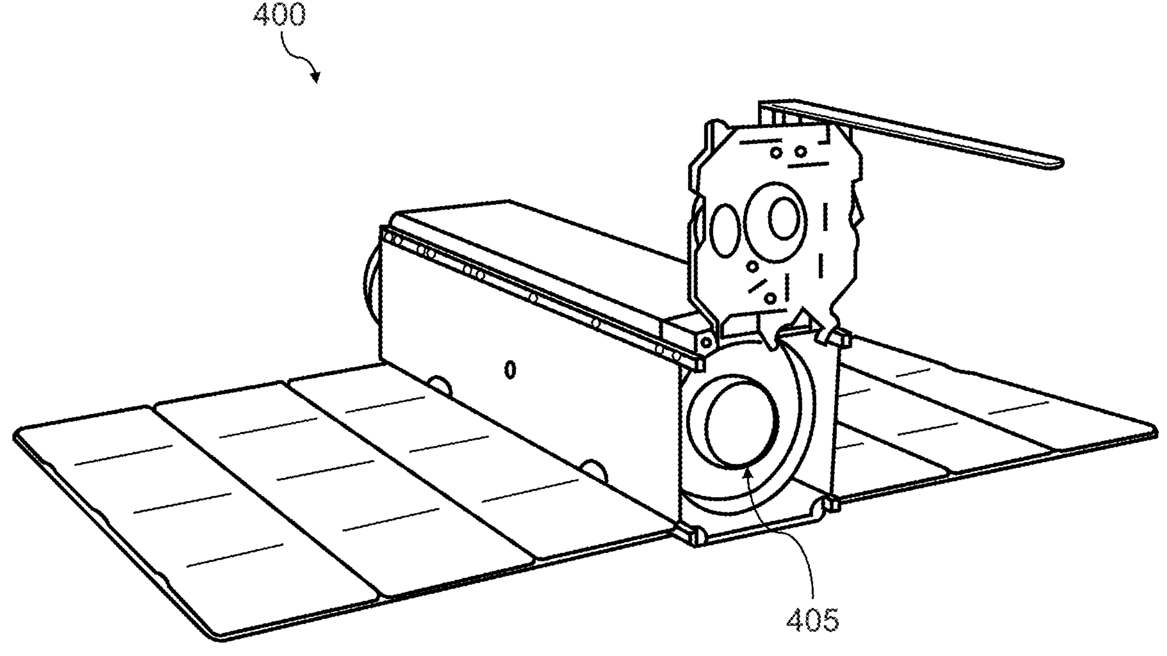
FIG. 4B depicts a spacecraft according to example embodiments of the present disclosure.

The spacecraft 400 can include a primary payload sensor 405. In some embodiments, the primary payload sensor 405 can be used for imaging. For example, the primary payload sensor 405 can be a camera or telescope designed to capture images of the surface of the celestial body the spacecraft 400 is orbiting (e.g., a planet, moon). The primary payload sensor 405 can be aligned along a first axis 401 pointing down towards a celestial body 407. FIG. 4B illustrates a secondary view of the spacecraft 400, illustrates the primary payload sensor 405 from a bottom view of the spacecraft 400.

Additionally, or alternatively, the primary payload 405 can include other primary payloads in use by other spacecraft, such as various sensors or communications equipment for telecommunication satellites.

The spacecraft 400 can also include one or more secondary imaging systems, or sensors, 410 and 415. In the illustrated embodiment, the spacecraft 400 includes the sensors 410 and 415, but in other embodiments, the spacecraft 400 could include only one secondary imaging system or more than two secondary imaging systems.

The one or more secondary imaging systems 410 and 415 can be sensors, such as being a first star camera 410 and a second star camera 415 that can be used for determining a position and/or attitude of the spacecraft 400 based on one or more celestial bodies (e.g., a star). In the configuration of the spacecraft 400 shown in FIG. 4A, the sensors 410 and 415 can include a lens as an optical element, to allow for the spacecraft 400 to implement the star camera technology described herein.

In some embodiments, the sensors 410 and 415 can be aligned along the same axis as the primary payload sensor 405 (e.g., the first axis 401). In other embodiments, the sensors 410 and 415 can be aligned along different axes 402 and 403 than the primary payload sensor 405. For example, if the primary payload sensor 405 is aligned along a z-axis (first axis 401), each of the sensors 410 and 415 can be aligned along different axes 402 and 403, such as a first sensor (star camera) 410 being aligned along an x-axis 402 (e.g., pointing in a positive or negative direction of the x-axis 402) and a second sensor (star camera) 415 being aligned along a y-axis 403 (e.g., pointing in a positive or negative direction of the y-axis 403).

In determining the location on the celestial body 407 in which the primary payload 405 is pointing (i.e. the boresight of the primary payload), angular, or rotational, errors about the first axis 401 (aligned with the primary payload sensor 405) result in relatively small errors in determined or attributed ground position of the celestial body 407 compared to angular errors about the x-axis 402 or the y-axis 403. For example, when looking to nadir, or a point on the celestial sphere directly below the spacecraft 400, the ratio of angular error sensitivities on each axis is based on a camera field of view $\theta_{fov}$. Ground position error for the x and y axes 402, 403, caused by rotation error $\delta\theta_{perp}$ can be characterized as set forth in Equation 1

The ground position error caused by rotation error in the first axis 401 about which the primary payload sensor 405 (or boresight axis) can be characterized as set forth in Equation 2.

By imaging stars with the sensors 410 and 415 (e.g., star cameras) to determine the attitude of the spacecraft 400, minimizing rotational errors in the x-axis 402 and y-axis 403 can be emphasized over rotational errors in the first axis 401, in consideration of the degree of importance of such errors.

Figure 5:
FIG. 5 depicts a spacecraft according to example embodiments of the present disclosure.
Figure 5:
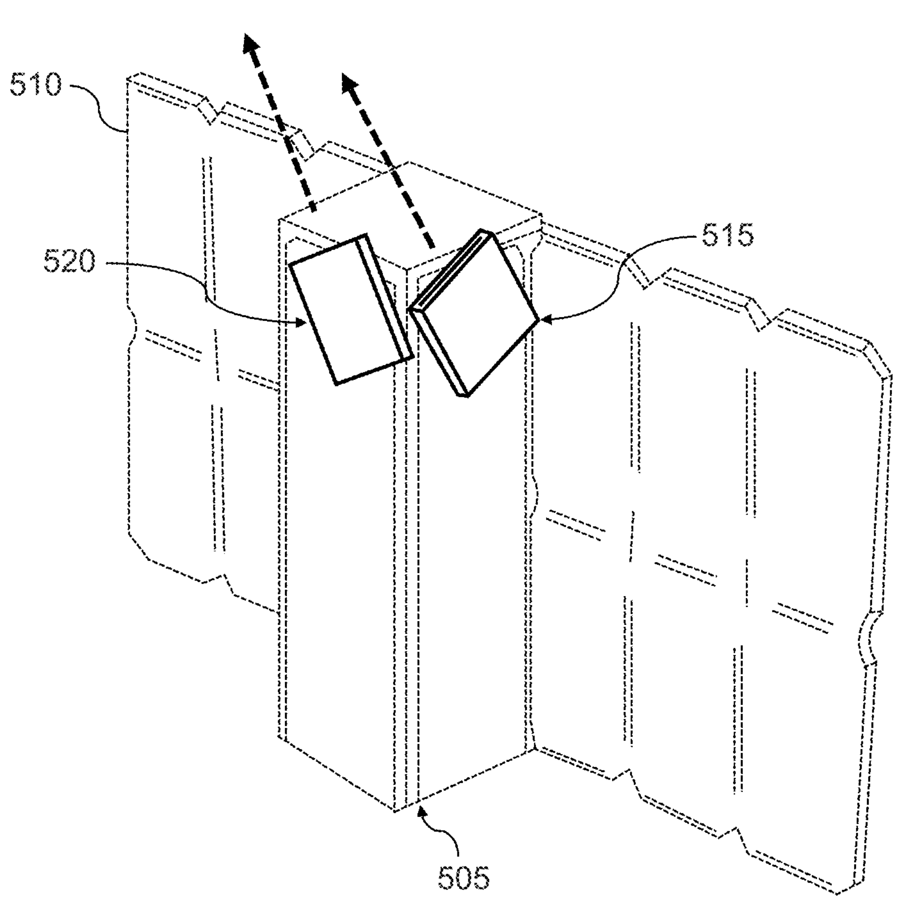
Figure 5:
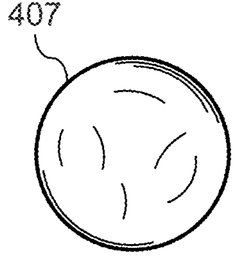

In some embodiments, the sensors can be mounted on a spacecraft at various angles. For example, FIG. 5 illustrates a spacecraft 500 according to example embodiments of the disclosure. Depending on how the spacecraft 500 is designed, it may be advantageous to mount the sensors 515 and 520 at angles that are not exactly perpendicular to the primary boresight axis of a primary payload sensor 505 of the spacecraft 500, as the orbit of the spacecraft 500 may create angles between the spacecraft 500 and the surface being imaged (e.g., a celestial body 507) or the Sun that cause lower-quality images to be captured due to a number of reasons, such as stray light interfering with the primary payload sensor 505.

Additionally, stray light from one or more photovoltaic panels 510 must be avoided to prevent interference with imaging performed by the primary payload sensor 505 or sensors 515 and 520. Therefore, the sensors 515 and 520 (e.g., which are acting as the one or more star cameras for the spacecraft 500) can be rotated about a face-normal axis associated with each respective sensors 515 and 520 without affecting resolving power. Sensitivity in the coarse direction may change, and this may be taken into account when selecting the aspect ratio and field of view for the various systems/sensors.

In some embodiments, the amount about which each sensor 515 and 520 is rotated about a face-normal axis can be determined based on an angular sensitivity ratio of the primary payload sensor 505. For example, in a camera with an angular sensitivity ratio of 120:1, the sensors 515 and 520 (e.g., star cameras) can be tilted, for example, by 60 degrees. This can include an aperture of the sensors 515 and 520 in the less sensitive direction by a factor of two, since the cosine of 60 degrees is ½. Therefore, the sensors 515 and 520 can be designed for a 60:1 angular sensitivity ratio.

Figure 6A:
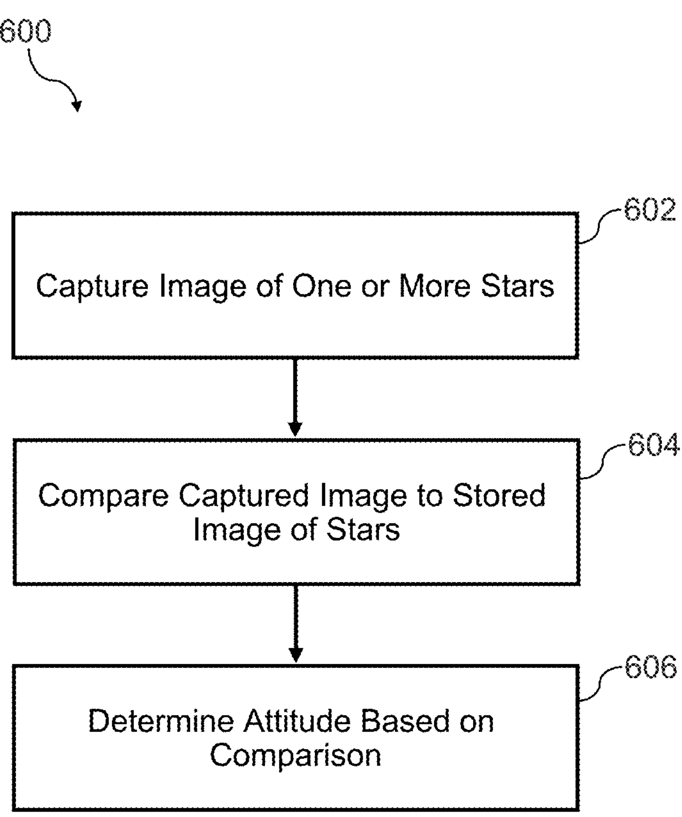
FIG. 6A-B depict flow charts of example methods according to example embodiments of the present disclosure.

FIG. 6A depicts a flow chart of a method 600 for determining an attitude of a spacecraft according to example embodiments of the present disclosure. The method 600 may be performed by a computing system described with reference to the other figures (e.g., FIG. 8). One or more portions of the methods may be implemented as an algorithm on the hardware components of the devices described herein. For example, the steps of the methods may be implemented as operations/instructions that are executable by computing hardware. This can include one or more non-transitory computer-readable media that store instructions that are executable by one or more processors to perform the operations of FIG. 6A or otherwise cause a computing system (e.g., onboard a spacecraft) to do so.

FIG. 6A illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure.

FIG. 6A is described with reference to elements/terms described with respect to other systems and figures, for example illustrated purposes and is not meant to be limiting. One or more portions of the methods may be performed additionally, or alternatively, by other systems.

At 602, using one or more secondary imaging systems (such as secondary imaging systems 410 and 415) of the spacecraft (such as spacecraft 400), an image of one or more stars can be captured. For instance, the computing system of a spacecraft 400 can provide command signals or other instructions to a controller associated with the one or more secondary imaging systems 410 and 415. The signals can indicate that the secondary imaging system(s) 410 and 415 are to capture an image of one or more stars that are within the field of view of the secondary imaging system(s) 410 and 415. As described herein, the secondary imaging system(s) 410 and 415 can be oriented at least partially away from the earth or other celestial body being targeted.

The secondary imaging systems 410 and 415 can take an image and process the image with processing circuitry located at the secondary imaging systems 410 and 415 (or otherwise onboard spacecraft 400) to return attitude quaternions and uncertainties, Euler angles, angular rates, or other values associated with positioning the spacecraft.

In some embodiments, the computing system can generate and provide instructions to tilt the spacecraft 400 or otherwise manipulate the attitude of the spacecraft 400 in a particular manner to obtain a particular image from the secondary imaging systems 410 and 415, obtain a particular ground image from the primary payload sensor 405, or perform another spacecraft functionality-related action. In some embodiments, based on the spacecraft functionality-related action, the computing system can generate and provide instructions to perform the action and then use data from the secondary imaging systems 410 and 415 to determine the position (e.g., coordinates) of the spacecraft 400 in space and, in some embodiments, determine a location on the celestial body the spacecraft 400 is orbiting that a primary payload senor 405 of the spacecraft is pointed at.

Additionally, or alternatively, the command signals can include information for directing the image capture by the secondary imaging systems 410 and 415. For example, the command signals may indicate the particular stars that should be imaged. Additionally, or alternatively, the command signals can indicate a position, angle, etc. of the secondary imaging systems 410 and 415.

Additionally, or alternatively, the command signals may indicate a timing parameter for image capture. This can include, for example, a time of day, time range, urgency, etc. for capturing the image via the secondary imaging systems 410 and 415. In some embodiments, the secondary imaging systems 410 and 415 can also include scheduling logic for scheduling when these images are to be captured, such as particular time intervals, position intervals, and the like.

The controller associated with the secondary imaging systems can access the information provided to it and control the secondary imaging systems 410 and 415 accordingly. For example, the controller can initiate image capture upon an instruction to do so. Additionally, or alternatively, if provided positional information, the controller can adjust the position of the secondary imaging systems 410 and 415 according to the positional constraints such that the designated stars are within the secondary imaging system's 410 or 415 field of view. The controller can trigger the secondary imaging systems 410 and 415 to capture one or more image frames of the star(s). The captured images can be stored onboard the spacecraft 400 in a memory, transmitted to another satellite, or downlinked to another computing system.

In some implementations, a command signal can indicate that an image of one or more stars is to be captured, without the additional information described above. The controller can be configured to receive the command signal and determine the parameters and constraints for capturing the image(s) via the secondary imaging systems 410 and 415. This can include, for example, determining targets-of-interest (e.g., particular stars), position parameters, timing parameters, etc.

In some embodiments, the secondary imaging systems 410 and 415 can include scheduling logic for scheduling when these images are to be captured, such as particular time intervals, position intervals, and the like. These quantities can be used to determine a position of the spacecraft 400.

At 604, the captured image can be compared to a stored, reference image, list or other reference data structure of the one or more stars. For example, the spacecraft 400 can include a memory storing images of known star constellations or a list of known stars. Additionally, or alternatively, the spacecraft 400 can include wireless communication circuitry to transmit the captured image to a remote computing system that stores the stored image or list.

The two images can be compared (or the image and the list can be compared) to determine if the stars in the captured image match the stars in the stored reference image, list, data structure, etc. For example, a computing system can be configured to perform a pixel level comparison of the star depicted in the captured image to the star depicted in the reference image. The comparison can also include positional/timing parameters, as well as the position of the spacecraft. The computing system can process the reference image, the captured image, and the additional information, using a machine-learned model or an algorithm to determine a similarity score between the star depicted in the captured image and the star in the reference image. The similarity score can be indicative of a confidence of the model/algorithm in the match between the stars.

A similarity score above a certain threshold can be indicative of a match. For example, a similarity score of greater than 95% can be considered a match of the stars in the captured image and that of the reference image.

Similar analysis can be performed for with another type of reference data structure, such as a stored list of stars.

At 606, an attitude of the spacecraft 400 can be determined based on the comparison. For example, based on one or more differences between the captured image and the stored image, the attitude of the spacecraft 400 can be determined. In other embodiments, the secondary imaging systems 410 and 415 can take an image and process the image with processing circuitry located at the secondary imaging systems 410 and 415 to return attitude quaternions and uncertainties, Euler angles, angular rates, or other values associated with positioning the spacecraft 400.

Figure 6B:
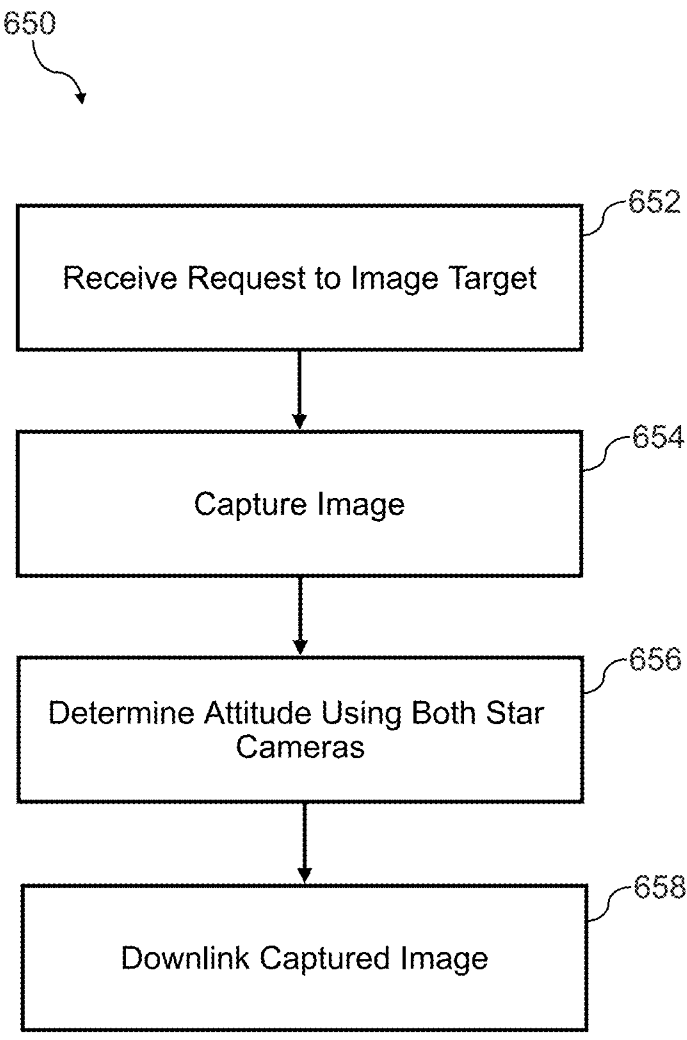

FIG. 6B depicts a flow chart of a method 650 for capturing an image according to example embodiments of the present disclosure. The method 650 may be performed by a computing system described with reference to the other figures (e.g., FIG. 8). One or more portions of the methods may be implemented as an algorithm on the hardware components of the devices described herein. For example, the steps of the methods may be implemented as operations/instructions that are executable by computing hardware. This can include one or more non-transitory computer-readable media that store instructions that are executable by one or more processors to perform the operations of FIG. 6B or otherwise cause a computing system (e.g., onboard a spacecraft) to do so.

FIG. 6B illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure.

FIG. 6B is described with reference to elements/terms described with respect to other systems and figures, for example illustrated purposes and is not meant to be limiting. One or more portions of the methods may be performed additionally, or alternatively, by other systems.

At 652, the method 650 can include receiving a request to image a target. For instance, a computing system onboard a spacecraft 400 can receive a request to capture images of a target. The request can include an instruction to capture images of the target, along with metadata that defines the parameters (e.g., target position, timing, etc.) for capturing the images of the target. The target can be located on the surface of the earth or otherwise within the atmosphere of the earth. The request can be based on a user request from a user or computing system for the images. A ground-based computing system can process the request, select the spacecraft 400 for capturing image(s) of the target, and transmit the request to the spacecraft 400.

In some embodiments, at 654, to capture a particular image of the target, the attitude of the spacecraft 400 can be adjusted. For example, the computing system can determine that the attitude of the spacecraft 400 needs to be adjusted to accurately fit the target into the satellite's camera field of view. This is the field of view of a primary payload sensor 405 (e.g., a main imaging system of the spacecraft 400) rather than the secondary imaging system(s) 410 and 415 (e.g., star cameras). One or more instructions to adjust the attitude of the spacecraft 400 can be generated and provided to propulsion systems or positioning systems to adjust the attitude of the spacecraft 400.

At 656, the method 650 can include capturing an image of the target. For instance, the computing system of the spacecraft 400 can transmit control signals to a primary payload sensor 405 (or a controller thereof) of the spacecraft 400 to capture images of the requested target. This can include, for example, capturing images of a target located on the surface of the earth.

At 658, the method 650 can include capturing an image of a star (or other celestial body). For example, as described herein, the spacecraft 400 can include one or more secondary imaging systems 410 and 415 (e.g., star cameras). The computing system of the spacecraft 400 can transmit control signals to the secondary imaging systems 410 and 415 (or controller(s) thereof) to capture image of one or more stars using the anisotropic camera technology described herein. The one or more stars can be within a field of view of the secondary imaging systems 410 and 415. As described herein, the images of the star(s) can be utilized to determine the precise positioning information of the imaged target (e.g., on the surface of the earth).

At 660, the method 600 can include downlinking the captured image of the requested target. For instance, the computing system of the spacecraft 400 can downlink a payload directly or indirectly to a ground-based computing system. The spacecraft 400 can do so directly to the extent it is positioned relative to the earth to be able to downlink to the surface. Additionally, or alternatively, the spacecraft 400 can utilize on or more relay satellites for its downlink.

In some embodiments, the positioning information (determined using the images of the stars captured by the secondary imaging systems 410 and 415) can be included with the payload of the captured image of the target. This information can provide more precise positioning information about the captured image/target.

Figure 7:
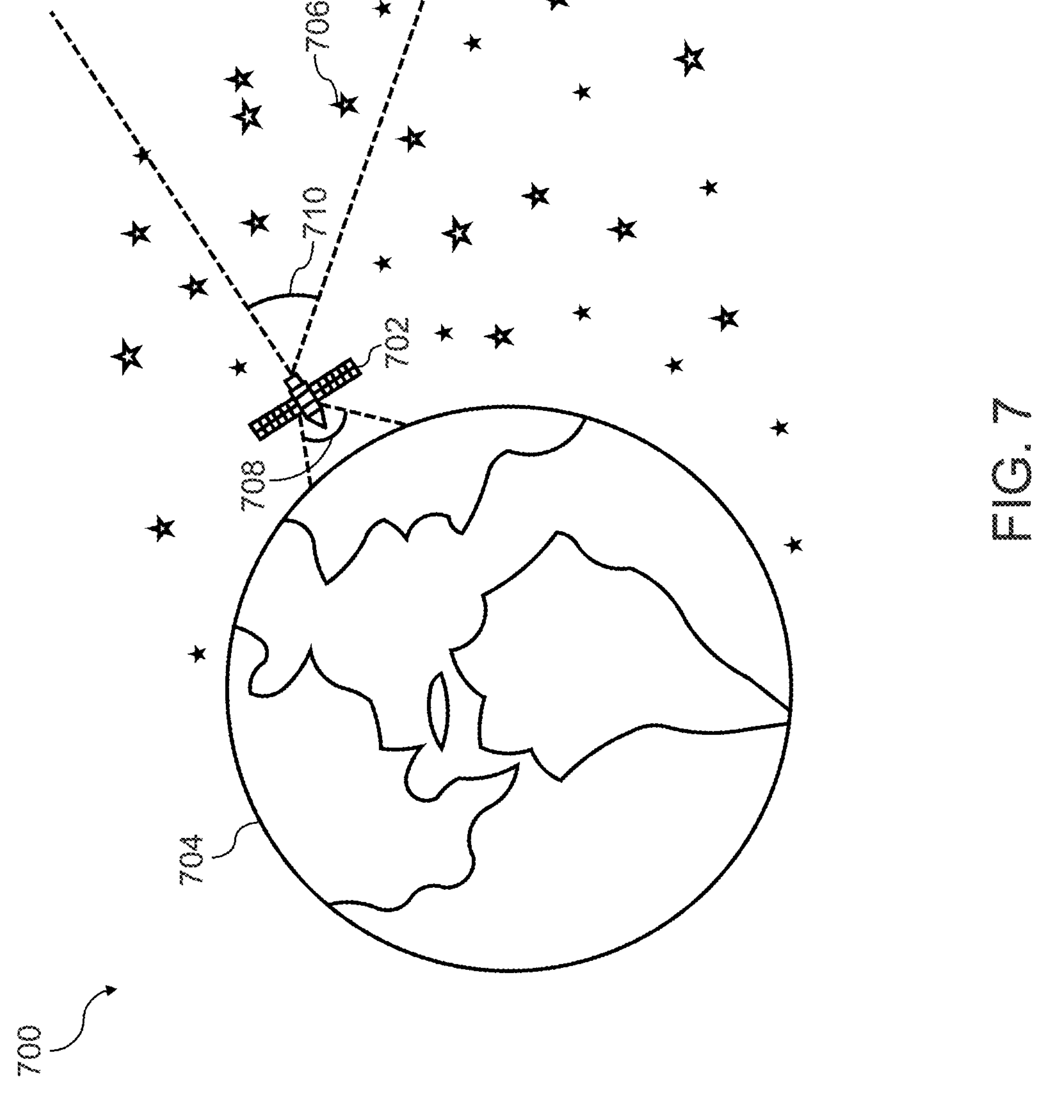
FIG. 7 depicts a diagram of a spacecraft determining an attitude according to example embodiments of the present disclosure.

FIG. 7 depicts a diagram of satellite system 700 that includes a spacecraft 702 determining an attitude of the spacecraft 702 according to example embodiments of the present disclosure. The spacecraft 702 can include an imaging satellite.

A primary payload sensor (e.g., primary camera) of the spacecraft 702 is pointed at a surface for imaging, such as the surface of Earth 704, and captures images in first field of view 708. One or more secondary imaging systems (e.g., star cameras) are pointed in different directions along different axes to capture images of the surrounding stars, such as star constellation 706, in a second field of view 710. In some embodiments, the second field of view 710 can be non-perpendicular to the first field of view 708. Based on the captured images of the star constellation 706, the spacecraft 702 can determine an attitude of the spacecraft 702. This attitude helps to determine a geolocation of what is being captured by the primary payload sensor in first field of view 708, and also helps to perform ground rectification of images captured in first field of view 708.

Figure 8:
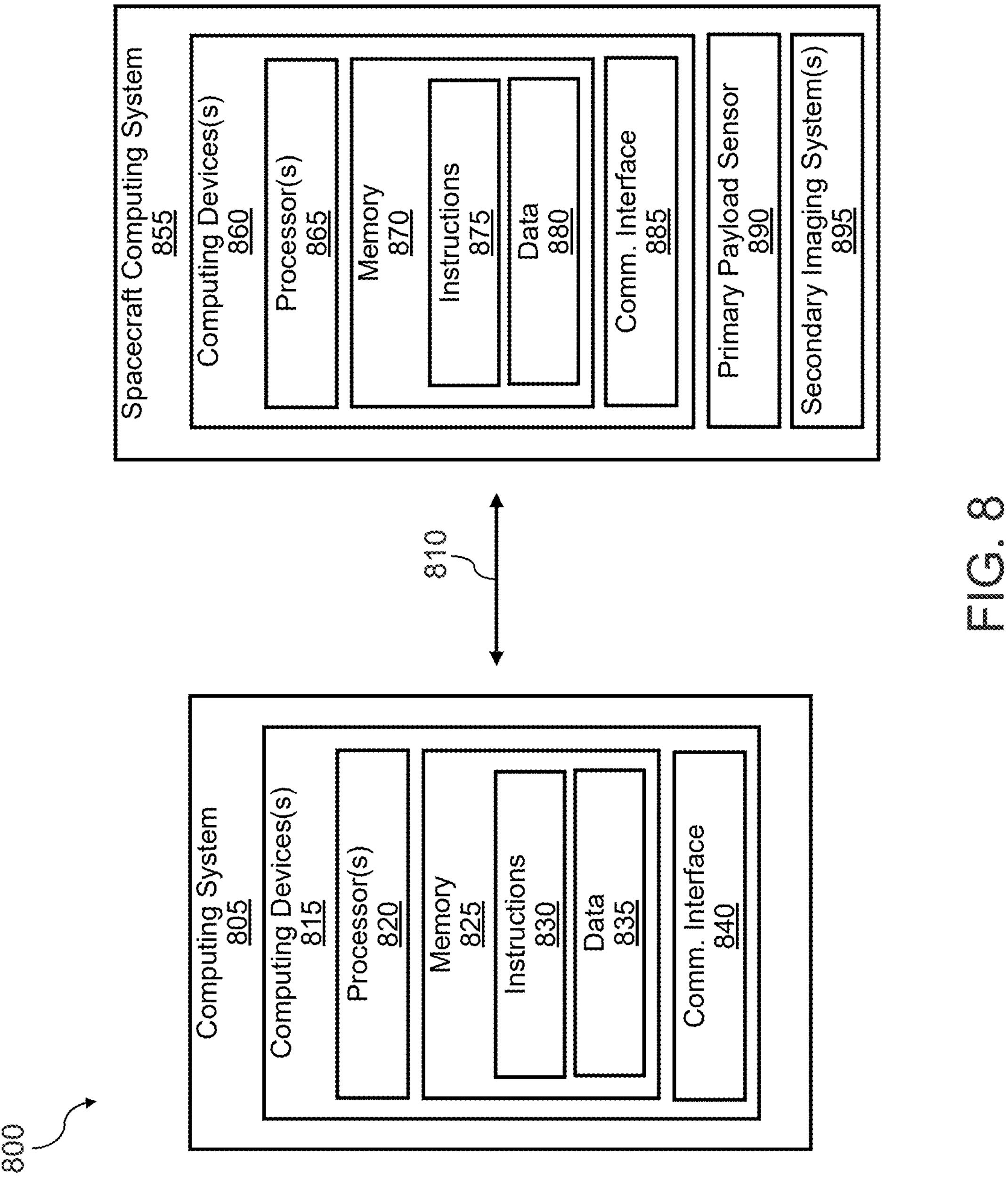
FIG. 8 depicts a block diagram of an example computing ecosystem according to example embodiments of the present disclosure.

FIG. 8 depicts an example computing ecosystem 800 that may be used to implement the methods and systems according to example aspects of the present disclosure. The system 800 may include computing system 805 (e.g., ground station) and spacecraft computing system 855, which may communicate with one another using transmission signals 810 (e.g., radio frequency transmissions). The system 800 may be implemented using a client-server architecture and/or other suitable architectures.

The computing system 805 may include one or more computing device(s) 815. Computing device(s) 815 may include one or more processor(s) 820 and one or more memory device(s) 825. Computing device(s) 815 may also include a communication interface 840 used to communicate with satellite 855 and/or another computing system/device. Communication interface 840 may include any suitable components for communicating with spacecraft computing system 855 and/or another system/device, including for example, transmitters, receivers, ports, controllers, antennas, or other suitable components.

Processor(s) 820 may include any suitable processing device, such as a microprocessor, microcontroller, integrated circuit, logic device, or other suitable processing device. Memory device(s) 825 may include one or more computer-readable media, including, but not limited to, non-transitory computer-readable media, RAM, ROM, hard drives, flash drives, or other memory devices. Memory device(s) 825 may store information accessible by processor(s) 820, including computer-readable instructions 830 that may be executed by processor(s) 820. Instructions 830 may be any set of instructions that when executed by processor(s) 820, cause one or more processor(s) 820 to perform operations. For instance, execution of instructions 830 may cause processor(s) 820 to perform any of the operations and/or functions for which computing device(s) 915 and/or computing system 805 are configured (e.g., such as the functions of a satellite ground station, GEO hub, etc.). In some implementations, execution of instructions 830 may cause processor(s) 820 to perform, at least a portion of, the methods according to example embodiments of the present disclosure.

As shown in FIG. 8, memory device(s) 825 may also store data 835 that may be retrieved, manipulated, created, or stored by processor(s) 820. Data 835 may include, for instance, any other data and/or information described herein. Data 835 may be stored in one or more database(s). The one or more database(s) may be connected to computing device(s) 815 by a high bandwidth LAN or WAN, or may also be connected to computing device(s) 815 through various other suitable networks. The one or more databases may be split up so that they are located in multiple locales.

Computing system 805 may exchange data with spacecraft computing system 855 using signals 810. Although one spacecraft computing system 855 is illustrated in FIG. 8, any number of spacecrafts may be configured to communicate with the computing system 805. In some implementations, spacecraft computing system 855 may be associated with any suitable type of satellite system, including satellites, mini-satellites, micro-satellites, nano-satellites, etc. Spacecraft computing system 855 may correspond to any of the satellites/platforms using the technology described herein.

Spacecraft computing system 855 may include computing device(s) 860, which may include one or more processor(s) 865 and one or more memory device(s) 870. Processor(s) 865 may include one or more central processing units (CPUs), graphical processing units (GPUs), and/or other types of processors. Memory device(s) 870 may include one or more computer-readable media and may store information accessible by processor(s) 865, including instructions 875 that may be executed by processor(s) 865. For instance, memory device(s) 870 may store instructions 875 for implementing a command, capturing imagery via its sensors (e.g., primary payload sensor, secondary imaging system), capture image data, downlinking, etc. In some implementations, execution of instructions 875 may cause processor(s) 865 to perform any of the operations and/or functions for a spacecraft described herein is configured. In some implementations, execution of instructions 875 may cause processor(s) 865 to perform, at least a portion of, the methods described herein.

Memory device(s) 870 may also store data 880 that may be retrieved, manipulated, created, or stored by processor(s) 865. Data 880 may include, for instance, image acquisition commands, tracks, sequences, position data, data associated with the satellite, image data (e.g., of stars, reference images, target images), other reference data (e.g., star lists) and/or any other data and/or information described herein. Data 880 may be stored in one or more database(s). The one or more database(s) may be connected to computing device(s) 860 by a high bandwidth LAN or WAN, or may also be connected to computing device(s) 860 through various other suitable networks. The one or more database(s) may be split up so that they are located in multiple locales.

Spacecraft computing system 855 may also include a communication interface 885 used to communicate with one or more remote computing device(s) (e.g., computing system 805, geostationary satellite(s), etc.) using signals 810. Communication interface 885 may include any suitable components for interfacing with one or more remote computing device(s), including for example, transmitters, receivers, ports, controllers, antennas, or other suitable components.

The spacecraft computing system 855 can include or otherwise be in communication with one or more sensors of the spacecraft. For example, the spacecraft can include a primary payload sensor 890 and one or more secondary imaging systems 895. As described herein, the primary payload sensor 890 (e.g., a first camera) may be configured to capture one or more image frames of a target (e.g., located on earth, within earth's atmosphere). A secondary imaging system 895 (e.g., a second camera) can include a star camera. The secondary imaging system(s) 895 can be configured according to the technology described herein. The spacecraft computing system 855 can be configured to determine the attitude/orientation of the spacecraft using the primary payload sensor 890 and secondary imaging system 895, as described herein.

In some implementations, one or more aspect(s) of communication among the components of system 800 may involve communication through a network. In such implementations, the network may be any type of communications network, such as a local area network (e.g. intranet), wide area network (e.g. Internet), cellular network, or some combination thereof. The network may also include a direct connection, for instance, between one or more of the components. In general, communication through the network may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Furthermore, computing tasks discussed herein as being performed at a server may instead be performed at a user device. Likewise, computing tasks discussed herein as being performed at the user device may instead be performed at the server.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A spacecraft, comprising:

a primary payload sensor, the primary payload sensor being aligned to capture images in a direction of a first axis; and at least one secondary imaging system for determining a position of the spacecraft, the at least one secondary imaging system being aligned to capture images in the direction of a second axis, the at least one secondary imaging system comprising:

a housing, the housing comprising a first end and a second end, wherein the first end comprises an opening into an internal portion of the housing;

an image sensor positioned within the internal portion of the housing; and an optical element positioned within the internal portion of the housing, wherein the optical element has a length parameter and a width parameter, and wherein one of the length parameter and the width parameter is larger than the other of the length parameter and the width parameter.

2. The spacecraft of claim 1, wherein the at least one secondary imaging system comprises two sensors, wherein a first sensor of the two sensors is a first star camera aligned along the second axis and a second sensor of the two sensors is a second star camera aligned along a third axis that is different from the first axis and the second axis.

3. The spacecraft of claim 1, wherein the primary payload sensor is a primary imaging camera for the spacecraft.

4. The spacecraft of claim 1, wherein the opening is substantially rectangular in shape and the optical element is substantially rectangular in shape.

5. The spacecraft of claim 1, wherein the opening is substantially elliptical in shape and the optical element is substantially elliptical in shape.

6. The spacecraft of claim 1, the housing further comprising baffling for preventing the image sensor from receiving stray light.

7. The spacecraft of claim 6, wherein the baffling comprises at least one of internal baffling and external baffling, wherein the baffling can be selected based on a field of view of the secondary imaging system.

8. The spacecraft of claim 1, wherein the opening of the housing of the at least one secondary imaging system is off-axis from a central axis of the housing.

9. The spacecraft of claim 1, wherein the length parameter and the width parameter of the optical element are selected based on an angular sensitivity ratio of the secondary imaging system.

10. The spacecraft of claim 1, wherein the at least one secondary imaging system is configured to capture images of one or more stars.

11. The spacecraft of claim 10, wherein the captured images of one or more stars are compared to one or more known images of stars to determine an attitude of the spacecraft.

12. The spacecraft of claim 1, wherein a field of view of the at least one secondary imaging system is perpendicular to the first axis.

13. The spacecraft of claim 1, wherein a field of view of the at least one secondary imaging system is non-perpendicular to the first axis.

14. The spacecraft of claim 1, wherein the optical element is a mirror, wherein the mirror is positioned at a distal end of the housing opposite the opening, wherein the mirror is configured to reflect light from the opening to the image sensor, and wherein the image sensor is positioned proximate to the opening.

15. The spacecraft of claim 1, wherein the optical element is a lens, wherein the lens is positioned proximate to the opening of the housing, wherein light from the opening passes through the lens to the image sensor, and wherein the image sensor is positioned at a distal end of the housing opposite the opening.

16. A spacecraft navigation system, the spacecraft navigation system comprising:

a housing, the housing comprising a first end and a second end, wherein the first end comprises an opening into an internal portion of the housing;

an image sensor positioned within the internal portion of the housing;

an optical element positioned within the internal portion of the housing, wherein the optical element has a length parameter and a width parameter, wherein at least one of the length parameter and the width parameter is larger than the other of the length parameter and the width parameter; and a computing system configured to:

compare an image obtained by the image sensor of one or more stars to a stored image of the one or more stars; and determine an attitude of the spacecraft based on the comparison.

17. The spacecraft navigation system of claim 16, wherein the length parameter is larger than the width parameter by a factor selected from a range of factors from about 20 times larger to about 150 times larger.

18. The spacecraft navigation system of claim 16, wherein the optical element is a mirror, wherein the mirror is positioned at a distal end of the housing opposite the opening, the mirror is configured to reflect light from the opening to the image sensor, and the image sensor is positioned proximate to the opening.

19. The spacecraft navigation system of claim 16, wherein the optical element is a lens, wherein the lens is positioned proximate to the opening of the housing, wherein light from the opening passes through the lens to the image sensor, and wherein the image sensor is positioned at a distal end of the housing opposite the opening.

20. A method for determining an attitude of a spacecraft, the method comprising:

capturing, by at least one secondary imaging system of the spacecraft, an image of one or more stars, the at least one secondary imaging system being aligned along a second axis that is different than a first axis of a primary payload sensor of the spacecraft, the at least one secondary imaging system comprising:

a housing, the housing comprising a first end and a second end, wherein the first end is an opening into the housing;

an image sensor positioned within the housing; and an optical element positioned in the opening of the first end, wherein the optical element has a length parameter and a width parameter, and wherein one of the length parameter and the width parameter is larger than the other of the length parameter and the width parameter;

comparing the image of one or more stars to a stored image of the one or more stars; and determining the attitude of the spacecraft based on the comparison of the image of one or more stars to the stored image.

21. The method of claim 20, wherein the at least one secondary imaging system comprises two sensors, wherein a first sensor of the two sensors is a first star camera aligned along the second axis and a second sensor of the two sensors is a second star camera aligned along a third axis that is different from the first axis and the second axis.

22. The method of claim 20, wherein the housing is substantially rectangular in shape, the opening is substantially rectangular in shape, and the optical element is substantially rectangular in shape.

23. The method of claim 20, wherein the housing is substantially elliptical in shape, the opening is substantially elliptical in shape, and the optical element is substantially elliptical in shape.

24. The method of claim 20, wherein the opening is off-axis from a central axis of the housing.

25. The method of claim 24, wherein at least one of internal baffling and external baffling of the housing can be selected based on a field of view of the secondary imaging system.

26. The method of claim 20, wherein the length parameter and the width parameter are selected based on an angular sensitivity ratio of the secondary imaging system.

27. The method of claim 20, wherein the optical element is a mirror, wherein the mirror is positioned at a distal end of the housing opposite the opening, wherein the mirror is configured to reflect light from the opening to the image sensor, and wherein the image sensor is positioned proximate to the opening.

28. The method of claim 20, wherein the optical element is a lens, wherein the lens is positioned proximate to the opening of the housing, wherein light from the opening passes through the lens to the image sensor, and wherein the image sensor is positioned at a distal end of the housing opposite the opening.

* * * * *